United States Patent

Rando

[19]

[11] Patent Number: 5,917,587
[45] Date of Patent: Jun. 29, 1999

[54] AUTOMATIC PLUMB LASER BEAM GENERATOR

[75] Inventor: Joseph F. Rando, Los Altos Hills, Calif.

[73] Assignee: Levelite Technology, Inc., Mountain View, Calif.

[21] Appl. No.: 09/103,263

[22] Filed: Jun. 23, 1998

[51] Int. Cl.[6] ............................... G01C 1/10; G01C 9/12
[52] U.S. Cl. ........................................ 356/149; 356/250
[58] Field of Search .................................. 356/148, 250, 356/249, 399, 139.05, 138–139, 139.08, 140, 141.1, 141.2, 141.3, 142–143, 145, 146, 147, 150, 151, 153, 248, 253, 254; 359/668, 669, 670, 671, 719; 33/273, 274, 278, 280–286, 290–298

[56] References Cited

U.S. PATENT DOCUMENTS

| | | | |
|---|---|---|---|
| 3,936,197 | 2/1976 | Aidrink et al. | 356/250 |
| 4,221,483 | 9/1980 | Rando | 356/250 |
| 4,912,851 | 4/1990 | Rando | 33/227 |
| 5,459,932 | 10/1995 | Rando | 33/291 |
| 5,524,352 | 6/1996 | Rando | 33/291 |
| 5,541,727 | 7/1996 | Rando | 356/149 |
| 5,619,802 | 4/1997 | Rando | 33/291 |
| 5,825,555 | 10/1998 | Oono et al. | 359/668 |

*Primary Examiner*—Frank G. Font
*Assistant Examiner*—Michael P. Stafira
*Attorney, Agent, or Firm*—Thomas M. Freiburder

[57] ABSTRACT

A plumb laser beam generator includes an internal self-leveling feature to assure the projection of a substantially plumb beam despite tilt of the instrument's housing. Tilt compensation is achieved in preferred embodiments using the angular deflection of a spring due to gravity along with the compensating angular magnification of a telescope which moves pendulously by support on the spring. A laser diode of the instrument is mounted fixedly in the housing, and the telescope resides above the diode and collimating optics, the telescope either hanging by a spring or supported at its base by a spring. The pendulous telescope preferably is motion-damped and includes motion limiting and shock absorbing devices to prevent damage due to sudden acceleration or dropping.

15 Claims, 6 Drawing Sheets

AUTOMATIC PLUMB LASER BEAM GENERATOR

BACKGROUND OF THE INVENTION

This invention relates to hand tools, and in particular the invention is concerned with a compact hand tool for projecting a plumb reference beam of visible light for precise alignment.

Many self-leveling plumb laser beam generators use ball bearings, wires, and springs to do the self-leveling function. There are also many instruments which use electronic sensors and motors for automatically leveling or plumbing laser beam projectors as required.

A low cost automatic self-leveling laser instrument is described in U.S. Pat. Nos. 5,459,932, 5,524,352, 5,541,727, and 5,619,802, assigned to the same assignee as the present invention. The disclosure of those patents is incorporated herein by reference. In these embodiments the laser projector is mounted on a pendulous platform which requires that the electrical power be carried to the moving pendulum via fine wires as shown schematically in FIG. 1. Other elements necessary for the self-leveling function are also shown. The subject invention is similar in application to the above-referenced patents.

U.S. Pat. No. 4,912,851 is also relevant to this invention in disclosing a plumb beam generator with optical tilt correction.

SUMMARY OF THE INVENTION

In the subject invention the compensation is achieved using the angular deflection of a spring due to gravity along with the compensating angular magnification of a telescope. Consider FIG. 2, schematically indicating the principles of the invention. The laser projector 2 is fixedly mounted on the housing 3, avoiding the complexity of routing power wires to the moving pendulum. Power wires are shown at 4. The laser beam 5 from the projector passes through the compensating telescope 6 and exits the housing through a window 7. No correcting optics are required in the window. When the housing is tilted the angular deflection causes the telescope 6 to angularly shift, i.e., swing rotationally, by an amount proportional to the weight of the telescope and inversely proportional to the stiffness of a spring 8. This telescope rotation steers the beam back to plumb. When the spring is above the telescope as in FIG. 2, a clockwise rotation of the housing causes a counterclockwise rotation of the telescope. Conversely, if the support spring is below the telescope, a clockwise rotation of the housing causes a clockwise rotation of the telescope. By choosing the sign and magnitude of the telescope power, the transmitted beam can be corrected for housing tilt, providing a tilt insensitive plumb reference beam.

The tilt compensation is further explained with reference to FIGS. 3A and 3B. The telescope 6a in this case is supported on a spring 8a the bottom end of which is fixed to the housing 3. In this example the magnification of the telescope 6a is 2 times and the telescope deflects half of the housing tilt angle. The 5 degree tilt of the housing shown in FIG. 3B is compensated for by a telescope tilt of 2.5 degrees which results in a beam deflection of 5 degrees restoring the beam to its original direction.

It is therefore an object of the invention to provide a compact hand tool for projecting a plumb reference beam despite an out-of-plumb condition of the tool itself, with relatively simple construction and straightforward optics, for use in precise vertical alignment. These and other objects, advantages and features of the invention will be apparent from the following description of preferred embodiments, considered along with the accompanying drawings.

DESCRIPTION OF PREFERRED EMBODIMENTS

Figure 4:
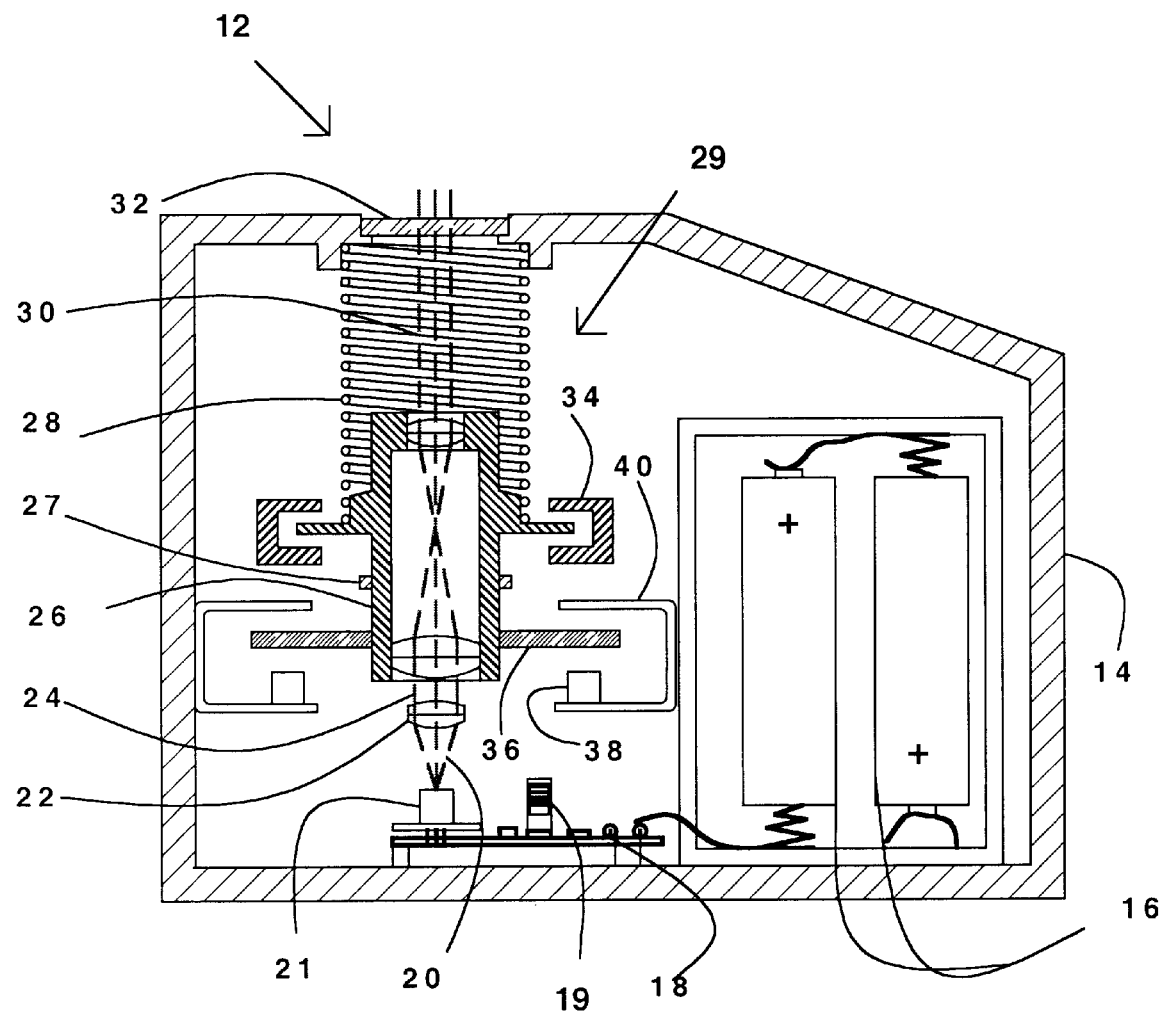
FIG. 4 is a sectional elevation view of a preferred embodiment showing details of construction, with the pendulum spring above the telescope.

FIG. 4 shows details of construction of a plumb beam generator 12 with tilt compensation. A housing 14 contains batteries 16 which supply the printed circuit board 18 with electrical power. The circuit controls the laser power when the exterior switch 19 is turned on. A beam 20 from the laser diode 21 is collimated by a lens 22. A resulting collimated beam 24 enters a pendulous two lens telescope 26 which is suspended by a spring 28 above. Both lenses are positive and the beam is reversed, as shown. A collar 27 provides for fine adjustment of the center of gravity of the pendulum (generally identified by 29) by axial adjustment motion of the collar along the telescope tube, to increase or decrease moment, thus affecting response of the pendulum to tilt. A tilt compensated beam 30 exits the window 32. The motion of the telescope is limited by mechanical stops 34 which prevent distortion of the spring in rough handling or inadvertent dropping onto a hard surface. In a preferred embodiment the motion of the pendulum 29 is damped by eddy current damping from a copper plate 36 mounted on the telescope 26, moving in a magnetic field caused by a magnet 38 and a pole piece 40. The drawing shows there are a symmetric stop 34, magnet 38 and pole piece 40 on the opposite side of the telescope.

Figure 5:
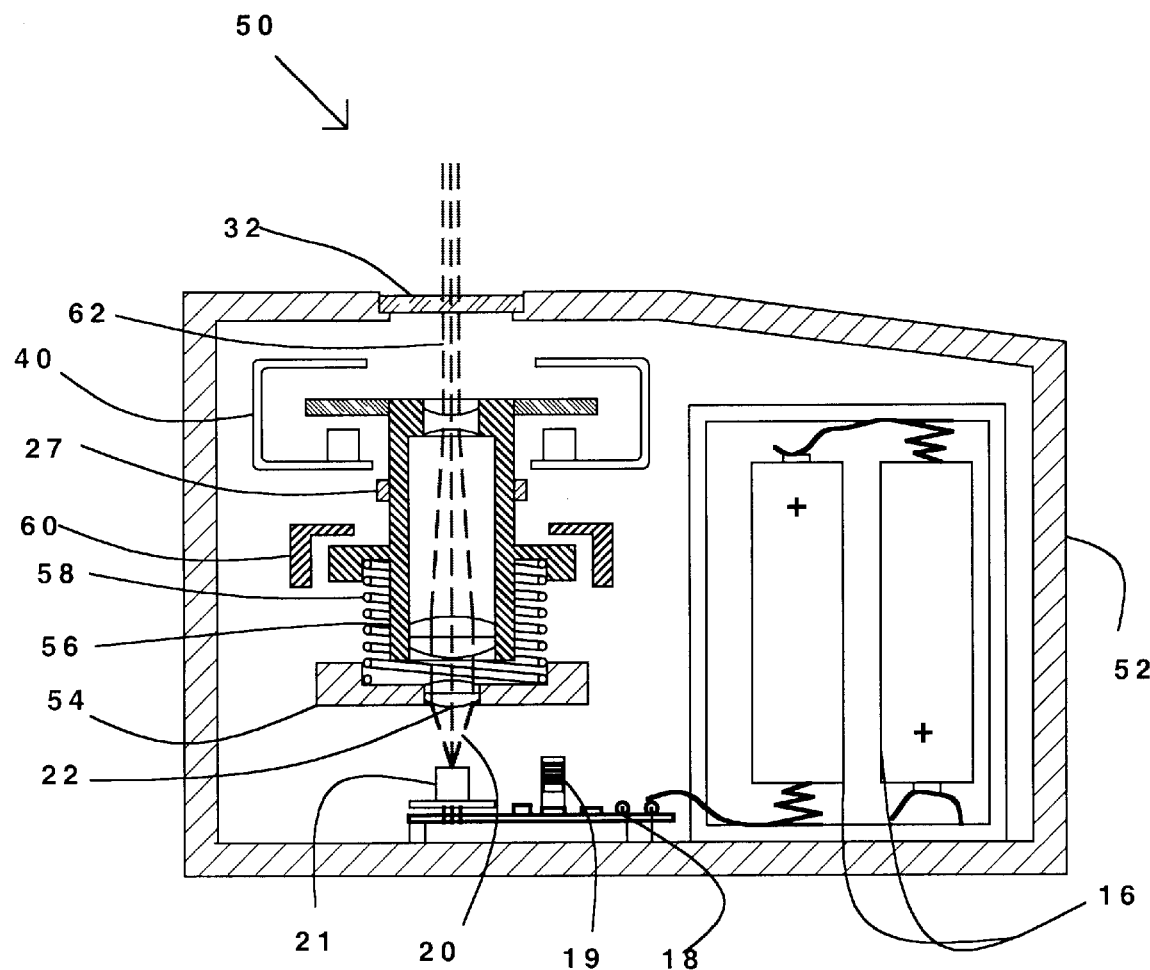
FIG. 5 is an elevation view of another preferred embodiment showing details of construction with the support spring below the telescope.

An alternate preferred embodiment 50 is shown in FIG. 5 in which the sign of the telescope magnification and the direction of rotation of the telescope have each been changed. A lens and spring support 54 is supported fixedly by the housing 52. A spring 58 is attached to the telescope 56 on one end and to the lens and spring mount 54 on the other. Mechanical limit stops 60 prevent the spring from being distorted through rough handling or dropping on a hard surface. A compensated beam 62 exits a window 32 in the housing. This embodiment can be slightly shorter in height than the embodiment of FIG. 4 and uses the same damping method.

Figure 6:
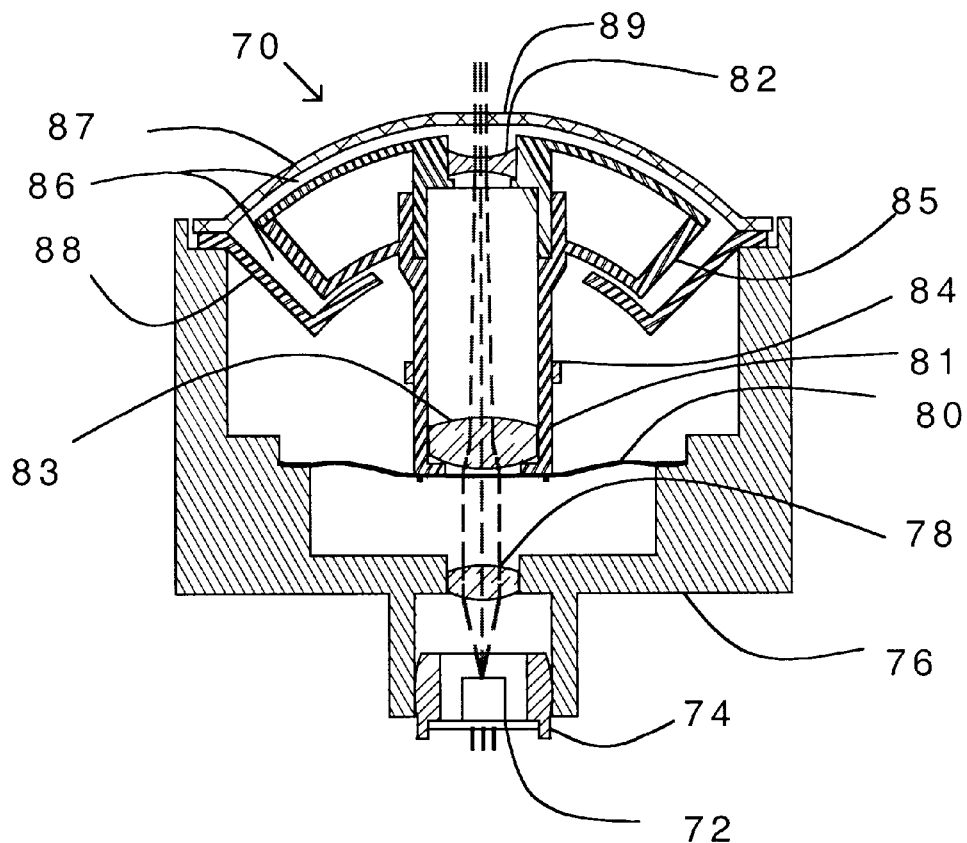
FIG. 6 is an elevation view of another preferred embodiment showing details of construction featuring air damping, a torsion leaf spring and a telescope of negative magnification.

An alternate preferred embodiment is shown generally at 70 in FIG. 6. This device uses air damping and a torsion leaf spring. A laser diode 72 is mounted in a holder 74 which allows for collimation and pointing and which is secured to a housing 76. The housing also holds a collimating lens 78. A leaf spring 80 provides the needed stiffness for compensation as described above and is further illustrated in FIG. 7. The telescope 81 of this embodiment contains negative and positive lenses 82 and 83 for the needed compensation. A collar 84 may be moved along the telescope tube to finely adjust the location of the center of gravity as needed for precise compensation adjustment. An air piston 85 mounted on the telescope moves about the center of rotation of the spring 80, within a chamber 86, causing the needed damping of mechanical vibrations. Outer walls of the damping chamber are formed by members 87 and 88. This structure is rotationally symmetric about the centerline of the laser beam as projected by the lens 78. A window 89 allows the light to exit. The required batteries and drive circuits are not shown in the figure.

Figure 7:
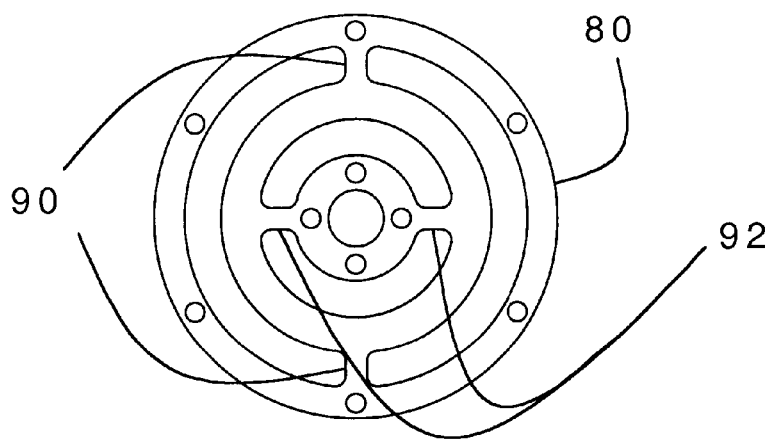
FIG. 7 is a plane view of a torsion leaf spring which can be used in the instrument of FIG. 6.

As shown in FIG. 7, the leaf spring 80 may comprise a single piece of thin metal which acts as a gimbal. Four narrow sections 90 and 92 twist in torsion providing the restoring force needed for compensation.

Figure 1:
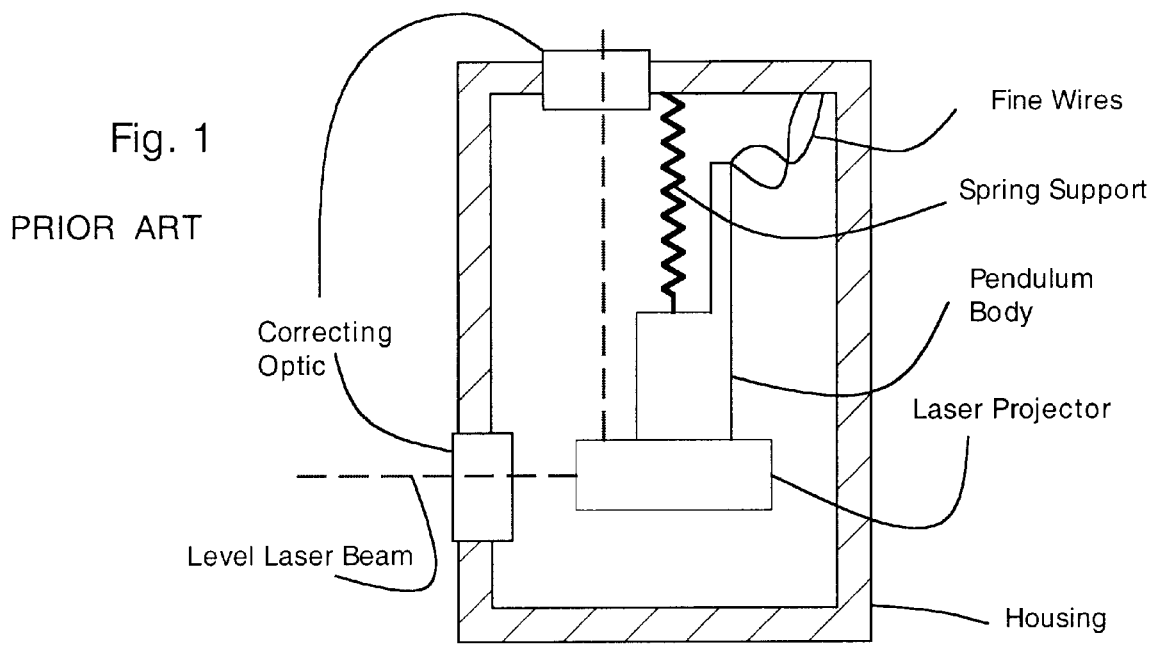
FIG. 1 is a schematic representation of the prior art showing function of a self-leveling multi-directional laser projector.
Figure 2:
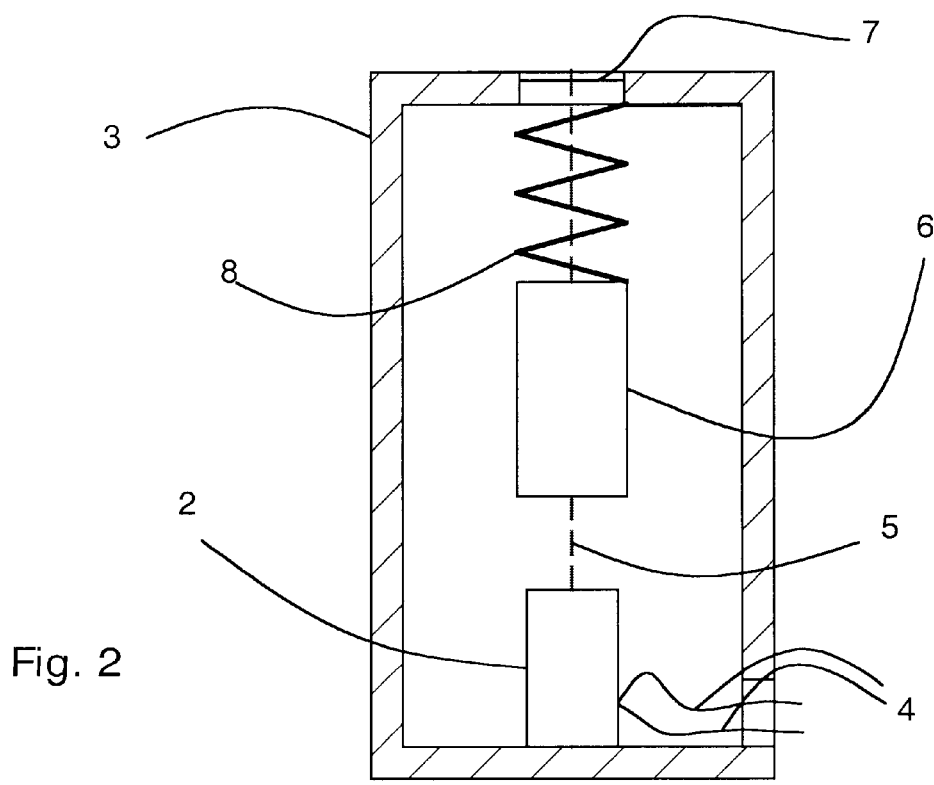
FIG. 2 is a schematic representation of the instant invention showing a pendulous telescope with a spring supporting the telescope from above.
Figure 3A:
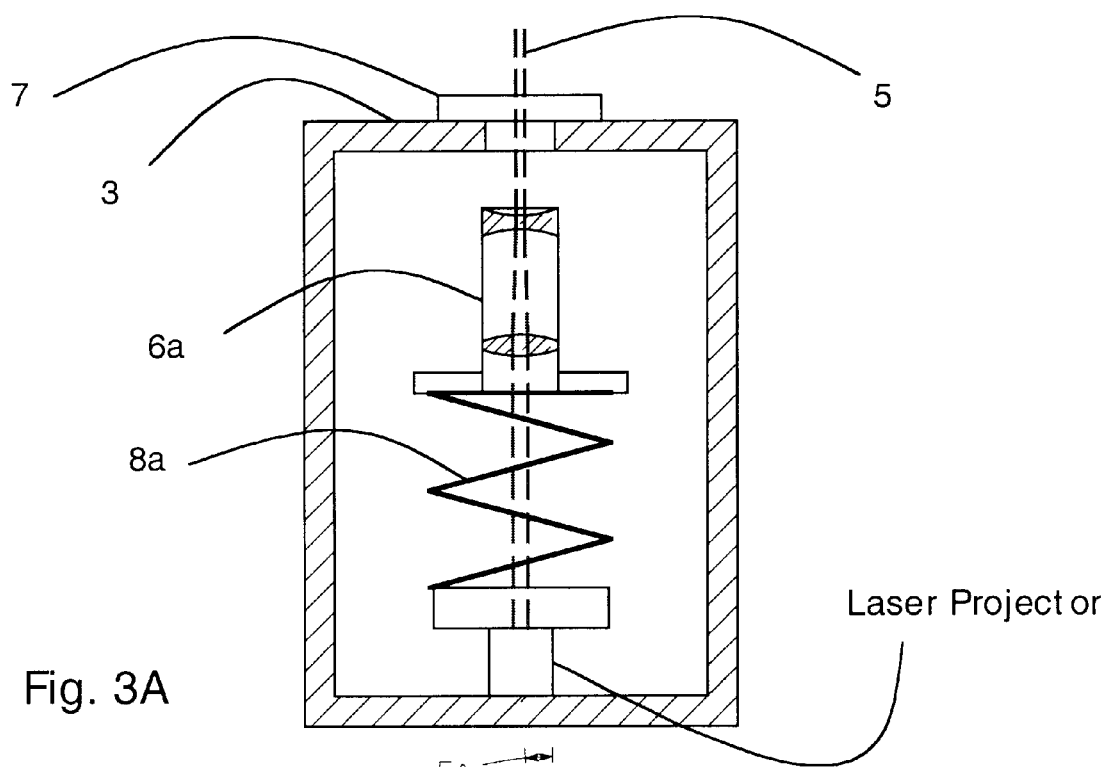
FIG. 3A is a schematic representation of the invention showing a pendulous telescope with the spring support below the telescope.
Figure 3B:
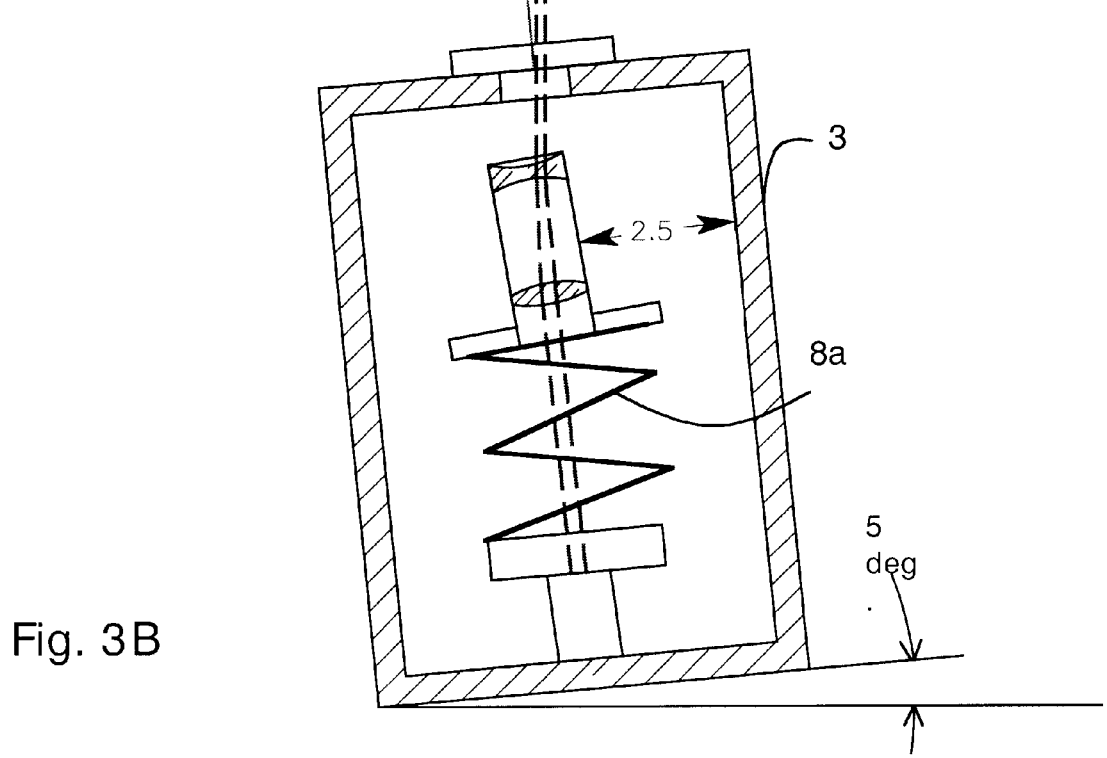
FIG. 3B shows the invention as in FIG. 3A, with the tool housing tilted 5 degrees.

In each of the instruments described, a small translation error results from tilt of the instrument. See FIG. 3B versus FIG. 3A—the emerging beam moves slightly to the left. In preferred embodiments the telescope, and the distance from the beam source to the exit end of the telescope, are made as short as possible, and the optics are designed to minimize this translation as much as possible.

Although the embodiments described involve generation of a substantially collimated laser beam which is projected through a telescope, the beam received by the telescope could be an uncollimated beam, provided the telescope optics can correct the beam to a collimated beam without requiring unduly large optical elements and without adversely affecting accurate tilt compensation.

Figure 8:
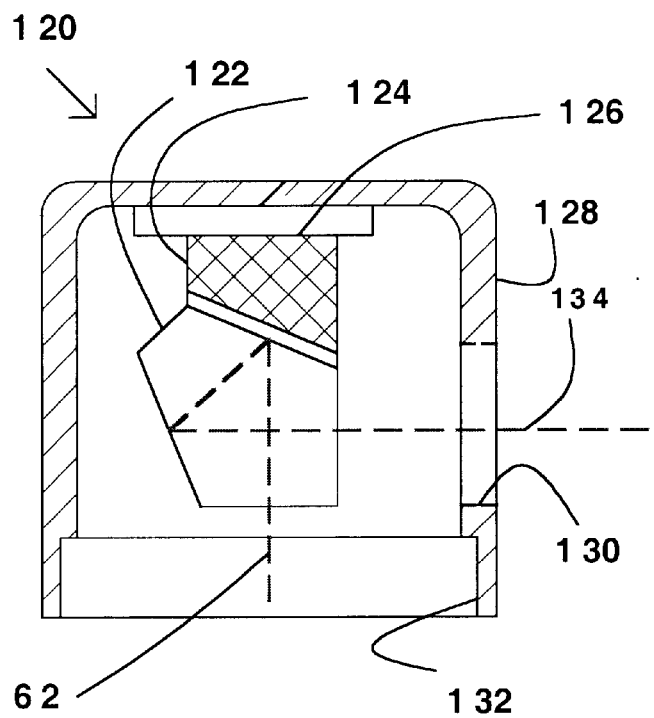
FIGS. 8–10 are schematic elevation views in section showing a self-leveling pentaprism accessory which can be used with the described embodiments, to produce a level beam.

A level reference beam can be created from the plumb beam by using a self-leveling pentaprism as shown generally by 120 in FIG. 8. A pentaprism 122 is hung by a flexible suspension member 124 from a support member 126 on the inside of a cap 128. A hole 130 in the cap allows the beam to exit the cap. This flexible member need only level approximately in one axis (tilting in and out of the page in FIG. 8) to produce an accurate 90 degree deviation of the beam. The flexible member 124 may be made of thin or very flexible rubber to combine flexibility with damping.

An inside lip 132 allows the cap 128 to fit over the plumb beam generator shown in FIG. 6, or the lip can fit over an appropriate bracket, flange or other connection on the instruments of FIGS. 4 and 5. By rotating the cap by hand a level reference plane can be defined with the exiting horizontal beam 134. The lip can also provide some height adjustment by allowing the cap to slide up and down on the upper edge of the housing of the device shown in FIG. 6.

Figure 9:
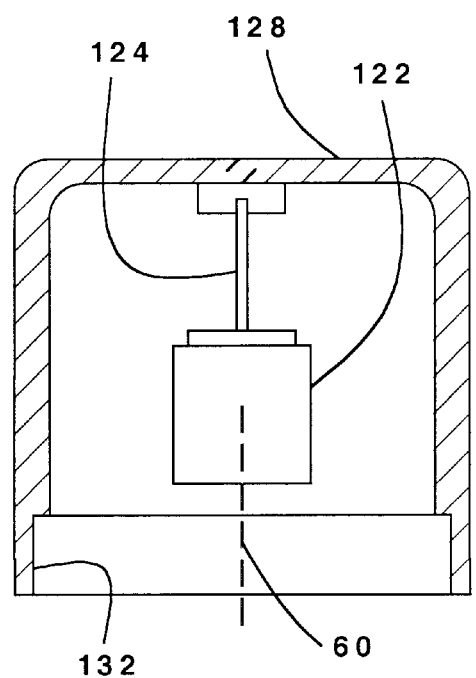
Figure 10:
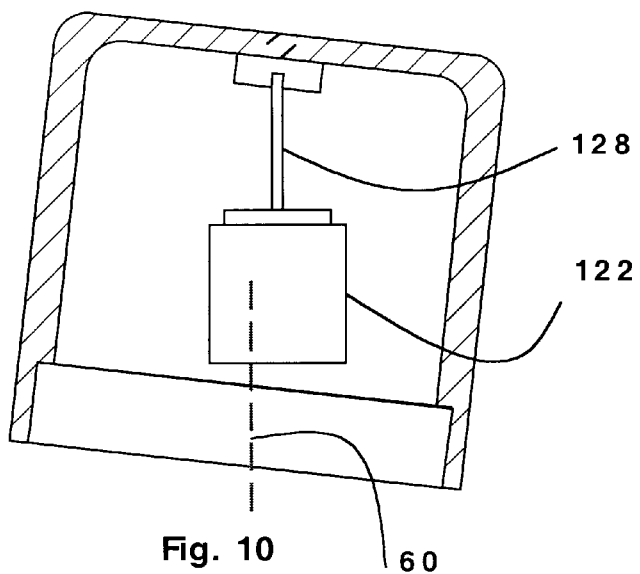

FIG. 9 is a section view of the pentaprism hanging from the cap, from a 90 degree rotated vantage point as compared to FIG. 8. FIG. 10, similar to FIG. 9, shows how the flexible member 122 allows the pentaprism to self level in one axis, the self-leveling now being within the plane of the drawing.

The terms "up", "down", "above", "below", etc. as used herein are for reference in describing the drawings, and are not intended to limit the invention to one orientation; the same principles can be used in a downwardly-projecting instrument, provided the sign and direction of rotation of the telescope are selected properly.

The above described preferred embodiments are intended to illustrate the principles of the invention, but not to limit its scope. Other embodiments and variations to this preferred embodiment will be apparent to those skilled in the art and may be made without departing from the spirit and scope of the invention as defined in the following claims.

I claim:

1. A portable hand tool for projecting a plumb laser beam in spite of a tilted condition of the tool, comprising:

a tool housing, laser beam generating means mounted in the housing for projecting a laser beam in a generally plumb direction and fixed relative to the housing, a telescope within the housing and positioned optically within the path of the laser beam, with pendulous mounting means supporting the telescope within the housing such that the position of the telescope in the housing swings rotationally about a generally horizontal axis due to gravity in response to tilting of the tool housing, the housing including a beam exit window positioned in the path of the beam from the telescope, and the telescope including optics selected such that, in combination with the degree of stiffness of the pendulous mounting means, the optics are effective to adjust the direction of the laser beam to substantially truly plumb despite a tilted condition of the tool, within an effective operating range.

2. The portable hand tool of claim 1, wherein the laser beam projecting means comprises a laser diode and a collimating lens effective to project a substantially collimated laser beam.

3. The portable hand tool of claim 1, wherein the pendulous mounting means comprises a spring having one end fixed to the housing and another end fixed to the telescope.

4. The portable hand tool of claim 3, wherein the spring is fixed to the housing at its lower end and secured to the telescope at its upper end, so that with clockwise tilt of the housing the telescope angularly shifts clockwise.

5. The portable hand tool of claim 3, wherein the spring is fixed to the housing at its upper end and secured to the telescope at its lower end, so that when the tool housing is tilted clockwise, the telescope angularly shifts in a counterclockwise direction.

6. The portable hand tool of claim 1, wherein the pendulous mounting means is fixed to the housing at its lower end and secured to the telescope at its upper end, and wherein the telescope comprises two spaced-apart lenses, an upper lens of which is a negative lens.

7. The portable hand tool of claim 1, wherein the pendulous mounting means is fixed to the housing at its upper end and secured to the telescope at its lower end, and wherein the telescope comprises two spaced-apart positive lenses.

8. The portable hand tool of claim 1, further including damping means acting between the housing and the telescope for damping the swinging motion of the telescope.

9. The portable hand tool of claim 8, wherein the damping means comprises a magnetic damping means.

10. The portable hand tool of claim 8, wherein the damping means comprises an air damping means.

11. The portable hand tool of claim 1, wherein the housing further includes stress limiting means for preventing damage to the telescope in the event of sudden acceleration or dropping of the tool.

12. The portable hand tool of claim 1, further including adjustment means for shifting the center of gravity up or down on the telescope, so as to shift the center of gravity of the telescope and adjust the angular shift response of the telescope to tilt conditions.

13. The portable hand tool of claim 12, wherein the adjustment means comprises an axially movable weight on the exterior of the telescope.

14. The portable hand tool of claim 1, in combination with an accessory for producing a horizontal laser beam from the plumb beam exiting the tool, the accessory comprising a housing with means for mounting the accessory on top of the portable hand tool so as to receive the plumb beam exiting the hand tool, a pentaprism in the housing for receiving the plumb beam and producing a horizontal beam and means in the housing for substantially self-leveling the pentaprism in one plane relative to a tilt condition of the portable hand tool and the accessory.

15. The combination as defined in claim 14, wherein the housing is cylindrical and sized to fit onto a cylindrical surface at the top of the hand tool, including a lip sized to closely fit over a cylindrical surface of the portable hand tool, serving as said means for mounting the accessory, so as to retain the hand tool and accessory together and to allow rotation of the accessory relative to the hand tool to produce an accurate level beam in a selected direction, or a level reference plane can be defined.

* * * * *